US011106822B2

(12) United States Patent
Nikain et al.

(10) Patent No.: US 11,106,822 B2
(45) Date of Patent: Aug. 31, 2021

(54) PRIVACY-AWARE CONTENT RECOMMENDATIONS

(71) Applicant: AT&T Intellectual Property I, L.P., Atlanta, GA (US)

(72) Inventors: Mohammad Nikain, Atlanta, GA (US); Daniel Connolly, Suwanee, GA (US); Vahid Tavassoli, Alpharetta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 175 days.

(21) Appl. No.: 16/210,286

(22) Filed: Dec. 5, 2018

(65) Prior Publication Data

US 2020/0184105 A1 Jun. 11, 2020

(51) Int. Cl.
  *G06F 21/62* (2013.01)
  *H04N 21/25* (2011.01)
  *H04N 21/442* (2011.01)
  *H04N 21/258* (2011.01)
  (Continued)

(52) U.S. Cl.
  CPC ....... *G06F 21/6254* (2013.01); *H04N 21/252* (2013.01); *H04N 21/25883* (2013.01); *H04N 21/25891* (2013.01); *H04N 21/44204* (2013.01)

(58) Field of Classification Search
  CPC .............. G06F 21/6254; H04N 21/252; H04N 21/25883; H04N 21/25891
  (Continued)

(56) References Cited

U.S. PATENT DOCUMENTS 7,146,329 B2 * 12/2006 Conkwright ........... G06Q 30/02
                                                                 705/14.66
7,243,129 B1 7/2007 Thomas
(Continued)

FOREIGN PATENT DOCUMENTS

| CN | 107257499 B | 9/2018 |
| WO | 2013143878 A3 | 12/2013 |
| WO | 2018165562 A1 | 9/2018 |

OTHER PUBLICATIONS

"On Content-Based Recommendation and User Privacy in Social-Tagging Systems"—Puglisi et al, Department of Telematics Engineering, Universitat Politècnica de Catalunya, Feb. 14, 2015 https://www.sciencedirect.com/science/article/pii/S0920548915000161 (Year: 2015).*

(Continued)

*Primary Examiner* — Randy A Scott

(57) ABSTRACT

The present disclosure provides methods, computer-readable media, and devices for making content recommendations in a manner that protects private user data. In one example, a method includes collecting content consumption history data for a specific user of a telecommunications network, inserting random noise into the content consumption history data to produce anonymized data, sending the anonymized data over a network to a centralized device, receiving correlation data from the centralized device, wherein the correlation data indicates correlations among a plurality of items of content that is available for consumption via the telecommunications network, and predicting a likelihood that the specific user would be interested in a particular item of the plurality of items of content, wherein the predicting is based on the content consumption history data and on the correlation data. The steps may be carried out by a processor of a user endpoint device.

20 Claims, 4 Drawing Sheets

(58) Field of Classification Search
USPC .................................. 726/26, 27, 28, 29, 30
See application file for complete search history.

(56) References Cited

U.S. PATENT DOCUMENTS

| | | | |
|---|---|---|---|
| 8,095,523 | B2 | 1/2012 | Brave et al. |
| 9,008,691 | B2 | 4/2015 | Busch |
| 9,094,414 | B2 | 7/2015 | Immonen et al. |
| 9,473,730 | B1 | 10/2016 | Roy et al. |
| 9,602,472 | B2 | 3/2017 | Nandi et al. |
| 9,626,503 | B2 | 4/2017 | Jung et al. |
| 9,639,881 | B2 | 5/2017 | Zhu et al. |
| 9,760,895 | B2 | 9/2017 | Morgan et al. |
| 9,792,366 | B2 | 10/2017 | Macadaan et al. |
| 10,068,614 | B2 * | 9/2018 | Olsen .................. H04N 21/8456 |
| 10,129,347 | B2 | 11/2018 | Fullett |
| 2007/0067297 | A1 | 3/2007 | Kublickis |
| 2009/0150340 | A1 | 6/2009 | Lhuillier et al. |
| 2009/0247193 | A1 | 10/2009 | Kalavade |
| 2014/0223575 | A1 | 8/2014 | Nandi et al. |
| 2016/0005099 | A1 * | 1/2016 | Picconi .................. G06F 16/337 705/26.7 |
| 2016/0140544 | A1 | 5/2016 | Howe et al. |
| 2016/0210463 | A1 | 7/2016 | Fawaz et al. |
| 2018/0150305 | A1 | 5/2018 | Jung |
| 2018/0211326 | A1 | 7/2018 | Bayley et al. |

OTHER PUBLICATIONS

"A Peer-to-Peer Recommender System with Privacy Constraints"—Pussep et al, Technische Universit"at Darmstadt, Germany, Apr. 2009 https://ieeexplore.ieee.org/stamp/stamp.jsp?tp=&arnumber=5066816 (Year: 2009).*

Chen, Ting, et al. "Content recommendation system based on private dynamic user profile." Machine Learning and Cybernetics, 2007 International Conference, vol. 4, IEEE, 2007. http://citeseerx.ist.psu.edu/viewdoc/download?doi=10.1.1.471.4858&rep=rep1&type=pdf.

Luo, Yongcheng, Jiajin Le, and Huilan Chen. "A privacy-preserving book recommendation model based on multi-agent." Computer Science and Engineering, 2009. WCSE'09. Second International Workshop, vol. 2, IEEE, 2009. http://booksc.xyz/book/30648980/c84a1c.

Puglisi, Silvia, et al. "On content-based recommendation and user privacy in social-tagging systems." Computer Standards & Interfaces 41 (2015): 17-27. https://www.researchgate.net/profile/Jordi_Forne/publication/272946535_On_Content-Based_Recommendation_and_User_Privacy_in_Social-Tagging_Systems/links/54fd817c0cf2c3f52424ea2d.pdf.

Pussep, Konstantin, et al. "A peer-to-peer recommender system with privacy constraints." Complex, Intelligent and Software Intensive Systems, CISIS'09. International Conference, IEEE, 2009. ftp://www.kom.tu-darmstadt.de/papers/PKFS09_567.pdf.

* cited by examiner

PRIVACY-AWARE CONTENT RECOMMENDATIONS

The present disclosure relates generally to digital data distribution, and relates more particularly to methods, computer-readable media, and devices for making content recommendations in a manner that protects private user data.

BACKGROUND

As the number, variety, and sources of entertainment content (e.g., television programs, video clips, music, podcasts, books, advertisements, and the like) continue to increase, it may become more difficult for content consumers to identify content in which they may be interested. As such, providers of entertainment content may provide individual content consumers with content recommendations that are tailored to their interests.

SUMMARY

The present disclosure provides methods, computer-readable media, and devices for making content recommendations in a manner that protects private user data. In one example, a method includes collecting content consumption history data for a specific user of a telecommunications network, inserting random noise into the content consumption history data to produce anonymized data, sending the anonymized data over a network to a centralized device, receiving correlation data from the centralized device, wherein the correlation data indicates correlations among a plurality of items of content that is available for consumption via the telecommunications network, and predicting a likelihood that the specific user would be interested in a particular item of the plurality of items of content, wherein the predicting is based on the content consumption history data and on the correlation data. The steps may be carried out by a processor of a user endpoint device.

In another example, a user endpoint device includes a processor and a non-transitory computer-readable medium storing instructions which, when executed by the processor, cause the processor to perform operations. The operations include collecting content consumption history data for a specific user of a telecommunications network, inserting random noise into the content consumption history data to produce anonymized data, sending the anonymized data over a network to a centralized device, receiving correlation data from the centralized device, wherein the correlation data indicates correlations among a plurality of items of content that is available for consumption via the telecommunications network, and predicting a likelihood that the specific user would be interested in a particular item of the plurality of items of content, wherein the predicting is based on the content consumption history data and on the correlation data.

In another example, a non-transitory computer-readable medium stores instructions which, when executed by a processor of a user endpoint device, cause the processor to perform operations. The operations include collecting content consumption history data for a specific user of a telecommunications network, inserting random noise into the content consumption history data to produce anonymized data, sending the anonymized data over a network to a centralized device, receiving correlation data from the centralized device, wherein the correlation data indicates correlations among a plurality of items of content that is available for consumption via the telecommunications network, and predicting a likelihood that the specific user would be interested in a particular item of the plurality of items of content, wherein the predicting is based on the content consumption history data and on the correlation data.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides methods, computer-readable media, and devices for making content recommendations in a manner that protects private user data. As discussed above, providers of entertainment content may provide individual content consumers (herein also referred to as "users") with content recommendations that are tailored to their interests. In order to provide the most relevant recommendations for a particular user, a service provider may require information about the particular user's content consumption habits (e.g., content the particular user has viewed/read/listened to in the past, times at which the particular user tends to view/read/listen to content, etc.). Collecting this information may be perceived as intrusive by some users, however.

Examples of the present disclosure employ a centralized device, such as a server, to collect aggregate statistics about the content consumption habits of a pool of users of a service provider network, without collecting any user-specific data about the users. The data that is aggregated into aggregate statistics may include random noise that is added by the individual users' endpoint devices (e.g., set top boxes, smart televisions, mobile phones, or the like) prior to the data being transmitted to the centralized device. Subsequently, the centralized device may forward the aggregate statistics to the user endpoint devices. The user endpoint devices may enhance the aggregate statistics with user-specific information, which is stored in the user endpoint devices, to improve the accuracy of content recommendations made to the individual users. In this way, more relevant recommendations may be made to individual users, without the individual users' private information being transmitted or leaving the user endpoint device.

Although examples of the present disclosure may be discussed within the illustrative context of viewable content or media (e.g., television programs, video clips, advertisements, and the like), it will be appreciated that the examples described herein could also be applied to other types of media. For instance, examples of the present disclosure could be implemented to recommend audible content or media (e.g., music, podcasts, audio books, and the like), printed content or media (e.g., books, magazines, newspapers, and the like), and other types of content. Moreover, examples of the present disclosure could be used to fine tune advertising material that is presented to a user, based on a prediction as to the types of advertising material to which the user may be receptive.

Figure 1:
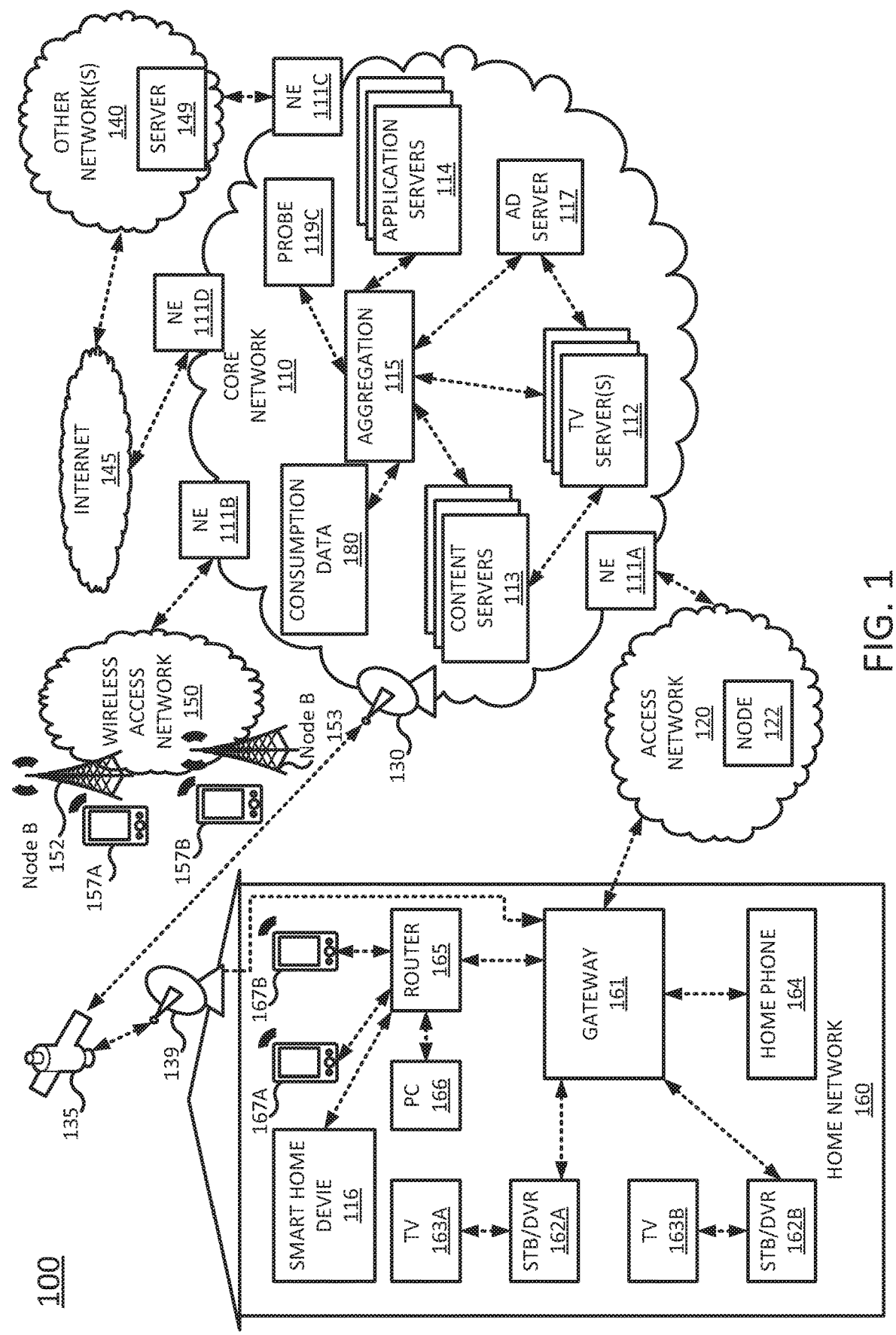
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B and home network devices such as home gateway 161, set-top boxes (STBs) 162A, and 162B, television (TV) 163A and TV 163B, home phone 164, router 165, personal computer (PC) 166, smart home or "Internet of Things" (IoT) device 116 (e.g., smart thermostat, smart lighting system, Internet radio intelligent personal assistant, etc.), and so forth, with one another and with various other devices via a core network 110, a wireless access network 150 (e.g., a cellular network), an access network 120, other networks 140 and/or the Internet 145. Mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116, may also be referred to herein as "customer devices" or "user endpoint devices." As discussed in further detail below, the user endpoint devices may store information regarding content correlations, which may be used by the user endpoint devices to make content recommendations to specific users associated with the user endpoint devices.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, a portable gaming device, an email device, a computing tablet, a messaging device, a global positioning system (GPS), a satellite radio receiver or satellite television receiver, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, an aggregation server 115, and a viewing data database 180. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113 and advertising server 117 to select which video programs, or other content and advertisements to provide to the home network 160 and to others.

In one example, content servers 113 may store scheduled television broadcast content for a number of television channels, video-on-demand programming, local programming content, and so forth. Content servers may also store non-video content, such as podcasts, audio books, electronic books, music, and the like. Content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

In one example, one or more of the application servers 114 may host a social media application, e.g., an Internet-based application via which users create and share of information. For instance, the social media application may comprise a personal and/or professional social networking application, a blogging or microblogging application, an image or video sharing application, a web feed, or the like. The social media application may maintain a profile for each user of the social media application, which the user can update at any time.

The consumption database 180 may store data regarding the consumption of content by a pool of users of the network 100. For instance, the consumption database 180 may store data transmitted by endpoint devices of the pool of users, where the endpoint devices track the content consumed by the respective users. In one example, the data stored in the consumption database 180 may include, for each user of the pool of users: content the particular user has viewed/read/ listened to in the past, times at which the particular user tends to view/read/listen to content, and/or other data. This data may be anonymized by the endpoint devices prior to transmission to the consumption database 180, e.g., through the insertion of random noise as discussed in further detail below.

In one example, the aggregation server 115 aggregates the data stored in the consumption database 180 to learn correlations among the individual instances of content stored on the TV server(s) 112, content server(s) 113, application server(s) 114, and ad server 117. The correlations may include, for example, content that tends to be consumed by a common group of users (e.g., users who consume Program A also tend to consume Program B, but not Program C), relationships between consumed or skipped advertisements, channel change frequencies, and other types of correlations. The aggregation server 115 may employ machine learning techniques to synchronize and merge data from the consumption database 180, television (TV) servers 112, content servers 113, application servers 114, advertising server (AS) 117, and network management system 116), and from other sources. The correlations learned by the aggregation server may be forwarded to the user endpoint devices (e.g., mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116) and used by those user endpoint devices to make content recommendations for specific users associated with the user endpoint devices.

Figure 4:
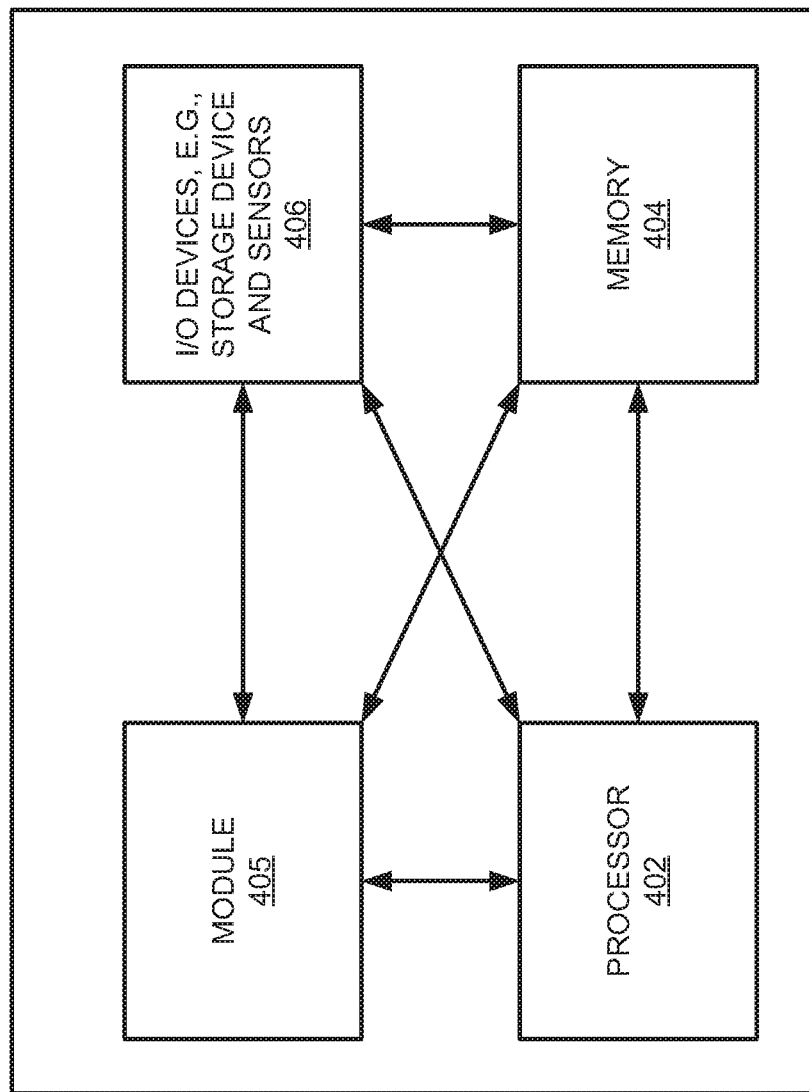
FIG. 4 depicts a high-level block diagram of a computing device specifically programmed to perform the functions described herein.

In one example, any or all of the television servers 112, content servers 113, application servers 114, aggregation server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
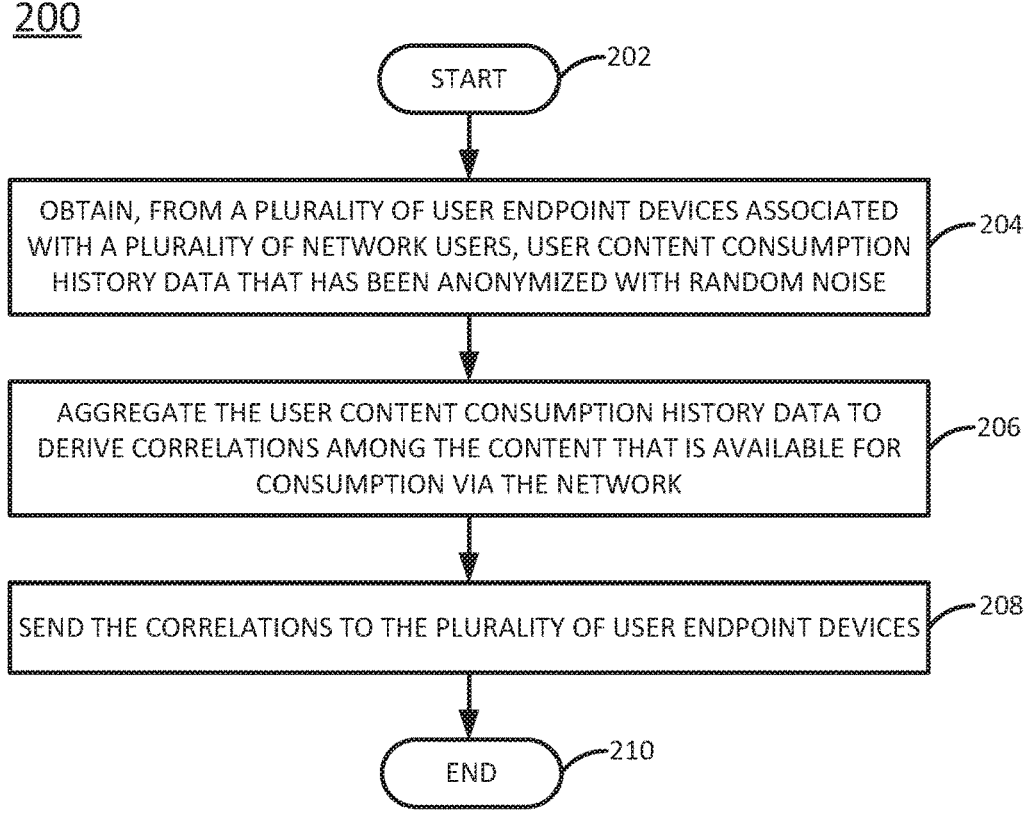
FIG. 2 illustrates a flowchart of an example method for analyzing content consumption data from a pool of users.

To further aid in understanding the present disclosure, FIG. 2 illustrates a flowchart of an example method 200 for analyzing content consumption data from a pool of users. In one example, the method 200 may be performed by a server such as the aggregation server 115 illustrated in FIG. 1 and/or the computing device 400 illustrated in FIG. 4. However, in other examples, the method 200 may be performed by another device. For the sake of example, steps of the method 200 are described as being performed by a processor.

The method 200 begins in step 202. In step 204, the processor may obtain user content consumption history data from a plurality of user endpoint devices associated with a plurality of network users. The user content consumption history data may comprise, for each user represented: items of content viewed/read/listened to by the user within some defined period of time (e.g., the past x days), a number of times that each item of content was viewed/read/listened to by the user, times at which the items of content were viewed/read/listened to by the user, explicit feedback provided by the user in response to each item of content (e.g., thumbs up or down, numerical rating, etc.), and/or other consumption statistics. In one example, the user content consumption history data that is received is anonymized with random noise, where the random noise may be inserted in the user content consumption history data by the plurality of user endpoint devices before being transmitted by the plurality of user endpoint devices. The random noise masks private user data that may be contained in the user content consumption history data (e.g., the user's identity, location, or the like).

In step 206, the processor may aggregate the user content consumption history data received in step 204 to derive correlations among the content that is available for consumption (e.g., x percent of users who viewed Program A also viewed Program B, users who live in Location C are y percent less likely to listen to Program D than users who live in Location E, etc.). In one example, a machine learning algorithm may be used to derive the correlations. Moreover, although the insertion of the random noise into the user content consumption history data effectively results in the loss of private user data, aggregate statistical information such as averages, distributions, and the like are largely unaffected by the random noise. In effect, when the user content consumption history data is collected from a large number of users, the random noise in the individual data sets cancels each other out. Thus, the correlations produced in step 206 may represent preferences for an "average" population.

In step 208, the processor may send the correlations derived in step 206 to at least one user endpoint device (e.g., a set top box, smart television, mobile phone, or the like). As described in further detail below, the user endpoint device may utilize the correlations to make content recommendations to a specific user based on the specific user's content consumption history, which may be stored in the user endpoint device.

The method 200 ends in step 210.

Figure 3:
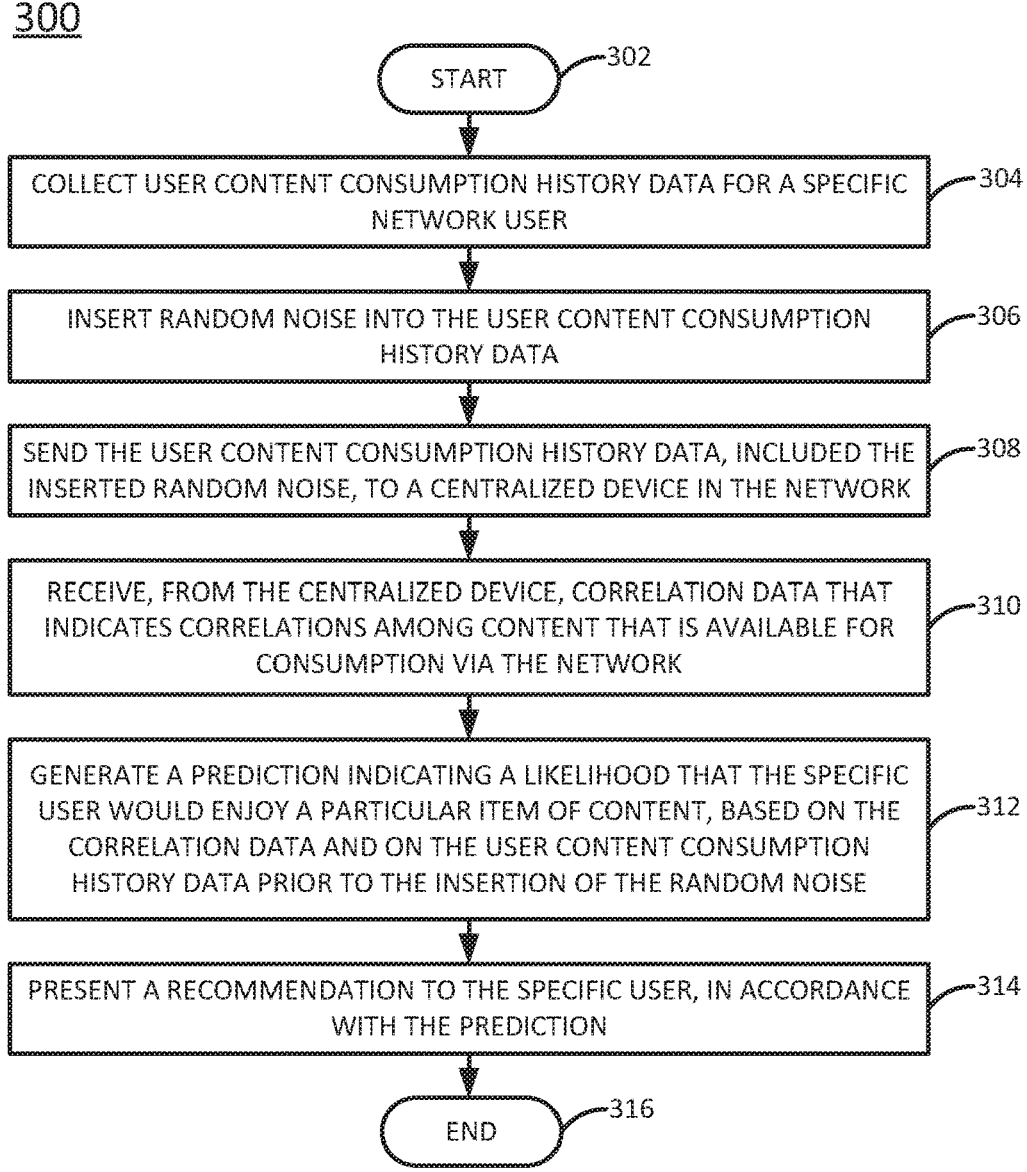
FIG. 3 illustrates a flowchart of an example method for recommending content to a user.

FIG. 3 illustrates a flowchart of an example method 300 for recommending content to a user. In one example, the method 300 may be performed by a mobile device such as mobile devices 157A, 157B, 167A and 167B illustrated in FIG. 1. The method 300 may also be performed by home network devices such as home gateway 161, set-top boxes (STBs) 162A, and 162B, television (TV) 163A and TV 163B, router 165, personal computer (PC) 166, and smart home device 116 illustrated in FIG. 1. The method 300 may also be performed by the computing device 400 illustrated in FIG. 4. In short, the method 300 may be performed by any device that is within the control of an individual user and is capable of communicating with a centralized device, such as a server. For the sake of example, steps of the method 300 are described as being performed by a processor.

The method 300 begins in step 302. In step 304, the processor may collect content consumption history data for a specific user of a network. The user content consumption history data may comprise: items of content viewed/read/listened to by the user within some defined period of time (e.g., the past x days), a number of times that each item of content was viewed/read/listened to by the user, times at which the items of content were viewed/read/listened to by the user, explicit feedback provided by the user in response to each item of content (e.g., thumbs up or down, numerical rating, etc.), and/or other content consumption statistics.

In step 306, the processor may insert random noise into the user content consumption history data. The random noise may be designed to remove or obscure private user information in the user content consumption history data (such as the user's identity, location, and the like). Thus, the resultant user content consumption history data including random noise may be considered anonymized data.

In step 308, the processor may send the anonymized data (i.e., the user content consumption history data, including the random noise inserted in step 306), to a centralized device in the network, such as a server operated by a telecommunications service provider.

In step 310, the processor may receive correlation data from the centralized device, where the correlation data indicates correlations among the content that is available for viewing/reading/listening over the network (e.g., x percent of users who viewed Program A also viewed Program B, users who live in Location C are y percent less likely to listen to Program D than users who live in Location E, etc.). The correlation data received from the centralized device may be derived, at least in part, from the anonymized data that was sent in step 308. The correlation data may be further derived from similarly anonymized data for other users, which may be sent to the centralized device by other user endpoint devices associated with the other users.

In step 312, the processor may generate a prediction, based on the correlation data received in step 310 and on the unaltered content consumption history data collected in step 304 (i.e., pre-insertion of the random noise), which may still be stored in a location accessible to the processor. The prediction may indicate, for example, a likelihood that the specific user from whom the content consumption history data was collected in step 304 would enjoy viewing/reading/listening to a particular item of content. In one example, a machine learning algorithm may be used to generate the prediction. In one example, generation of the prediction may also compute any deviations from the correlations for the specific user (e.g., a large percentage of users who provided positive feedback on Program A may have also provided positive feedback Program B, but the specific user may have provided positive feedback on Program A and negative feedback on Program B), and may fine tune the prediction in accordance with these deviations.

In step 314, the processor may present a recommendation to the specific user, based on the prediction generated in step 312. For example, the processor may recommend that the user view/read/listen to a particular item of content (where the prediction may indicate, for example, at least a threshold likelihood that the specific user would be interested in the particular item of content). The recommendation may be presented, for example, through a user interface on a display device (e.g., a television screen connected to a set top box, or a display of a mobile phone or Internet radio). For instance, available content may be presented in a sorted manner, with recommended content sorted or ranked more highly than content that is not recommended or that is predicted to be of little interest to the specific user. Recommended content could also be indicated by some sort of visual indicator (e.g., a star or other icon, bolded text, a separate list, or the like). The recommendation may also be sent to the specific user via email or text message, and may include a hyperlink that launches a media player for playing the particular item of content on a user endpoint device.

The method 300 ends in step 316.

Moreover, although not expressly specified above, one or more steps of the methods 200 and/or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 and/or FIG. 3 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, a server (such as might be used to perform the method 200) or a user endpoint device (such as might be used to perform the method 300) could be implemented as illustrated in FIG. 4.

As depicted in FIG. 4, the system 400 comprises a hardware processor element 402, a memory 404, a module 405 for making content recommendations in a manner that protects the privacy of user data, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for making content recommendations in a manner that protects the privacy of user data may include circuitry and/or logic for performing special purpose functions relating to making content recommendations in a manner that protects the privacy of user data. The input/output devices 406 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for making content recommendations in a manner that protects the privacy of user data (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for making content recommendations in a manner that protects the privacy of user data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:

collecting, by a processor of a content consumer endpoint device, content consumption history data for a specific content consumer of a telecommunications network;

inserting, by the processor of the content consumer endpoint device, random noise into the content consumption history data to produce anonymized data for the specific content consumer;

sending, by the processor of the content consumer endpoint device, the anonymized data for the specific content consumer over the telecommunications network to a centralized device;

receiving, by the processor of the content consumer endpoint device, correlation data from the centralized device, wherein the correlation data indicates correlations among a plurality of items of content that is available for consumption via the telecommunications network, wherein the correlations are derived from the anonymized data for the specific content consumer and anonymized data for other content consumers of the telecommunications network, and wherein the anonymized data for the other content consumers is sent to the centralized device by other content consumer endpoint devices;

predicting, by the processor of the content consumer endpoint device, a likelihood that the specific content consumer would be interested in a particular item of content of the plurality of items of content, wherein the predicting is based on the content consumption history data and on the received correlation data; and presenting, by the processor of the content consumer endpoint device, a recommendation to the specific content consumer of the particular item of content based on the predicted likelihood.

2. The method of claim 1, wherein the content consumption history data identifies an item of content from among the plurality of items of content that the specific content consumer consumed.

3. The method of claim 1, wherein the content consumption history data identifies a number of times that the specific content consumer consumed an item of content from among the plurality of items of content.

4. The method of claim 1, wherein the content consumption history data identifies a time at which the specific content consumer consumed an item of content from among the plurality of items of content.

5. The method of claim 1, wherein the content consumption history data identifies feedback that the specific content consumer provided in response to consuming an item of content from among the plurality of items of content.

6. The method of claim 1, wherein the random noise obscures personal data about the specific content consumer in the content consumption history data.

7. The method of claim 1, wherein the correlation data identifies a relationship between content of the plurality of items of content that was consumed by at least some content consumers of a plurality of content consumers including the specific content consumer and the other content consumers.

8. The method of claim 1, wherein the correlation data identifies a relationship between content of the plurality of items of content that was skipped by at least some content consumers of a plurality of content consumers including the specific content consumer and the other content consumers.

9. The method of claim 1, wherein the correlation data identifies a relationship between channel change frequencies of at least some content consumers of a plurality of content consumers including the specific content consumer and the other content consumers.

10. The method of claim 1, wherein the predicting accounts for a deviation in the content consumption history data from the correlation data.

11. The method of claim 1, wherein the likelihood indicates at least a threshold likelihood that the specific content consumer would be interested in the particular item of content.

12. A content consumer endpoint device, comprising:

a processor; and a non-transitory computer-readable medium storing instructions which, when executed by the processor, cause the processor to perform operations, the operations comprising:

collecting content consumption history data for a specific content consumer of a telecommunications network;

inserting random noise into the content consumption history data to produce anonymized data for the specific content consumer;

sending the anonymized data for the specific content consumer over the telecommunications network to a centralized device;

receiving correlation data from the centralized device, wherein the correlation data indicates correlations among a plurality of items of content that is available for consumption via the telecommunications network, wherein the correlations are derived from the anonymized data for the specific content consumer and anonymized data for other content consumers of the telecommunications network, and wherein the anonymized data for the other content consumers is sent to the centralized device by other content consumer endpoint devices;

predicting a likelihood that the specific content consumer would be interested in a particular item of content of the plurality of items of content, wherein the predicting is based on the content consumption history data and on the received correlation data; and presenting a recommendation to the specific content consumer of the particular item of content based on the predicted likelihood.

13. A non-transitory computer-readable medium storing instructions which, when executed by a processor of a content consumer endpoint device, cause the processor to perform operations, the operations comprising:

collecting content consumption history data for a specific content consumer of a telecommunications network;

inserting random noise into the content consumption history data to produce anonymized data for the specific content consumer;

sending the anonymized data for the specific content consumer over the telecommunications network to a centralized device;

receiving correlation data from the centralized device, wherein the correlation data indicates correlations among a plurality of items of content that is available for consumption via the telecommunications network, wherein the correlations are derived from the anonymized data for the specific content consumer and anonymized data for other content consumers of the telecommunications network, and wherein the anonymized data for the other content consumers is sent to the centralized device by other content consumer endpoint devices;

predicting a likelihood that the specific content consumer would be interested in a particular item of content of the plurality of items of content, wherein the predicting is based on the content consumption history data and on the received correlation data; and presenting a recommendation to the specific content consumer of the particular item of content based on the predicted likelihood.

14. The non-transitory computer-readable medium of claim 13, wherein the random noise obscures personal data about the specific content consumer in the content consumption history data.

15. The non-transitory computer-readable medium of claim 13, wherein the content consumption history data identifies an item of content from among the plurality of items of content that the specific content consumer consumed.

16. The non-transitory computer-readable medium of claim 13, wherein the content consumption history data identifies a number of times that the specific content consumer consumed an item of content from among the plurality of items of content.

17. The non-transitory computer-readable medium of claim 13, wherein the content consumption history data identifies a time at which the specific content consumer consumed an item of content from among the plurality of items of content.

18. The non-transitory computer-readable medium of claim 13, wherein the content consumption history data identifies feedback that the specific content consumer provided in response to consuming an item of content from among the plurality of items of content.

19. The non-transitory computer-readable medium of claim 13, wherein the random noise obscures personal data about the specific content consumer in the content consumption history data.

20. The non-transitory computer-readable medium of claim 13, wherein the correlation data identifies a relationship between content of the plurality of items of content that was consumed by at least some content consumers of a plurality of content consumers including the specific content consumer and the other content consumers.

\* \* \* \* \*